May 13, 1941. H. J. MANKOFF 2,241,667
GRINDING MACHINE FOR SHELLED CORN OR OTHER GRAIN
Filed April 3, 1939 3 Sheets-Sheet 1

INVENTOR.
HENRY J. MANKOFF
BY U. F. Charles
ATTORNEY.

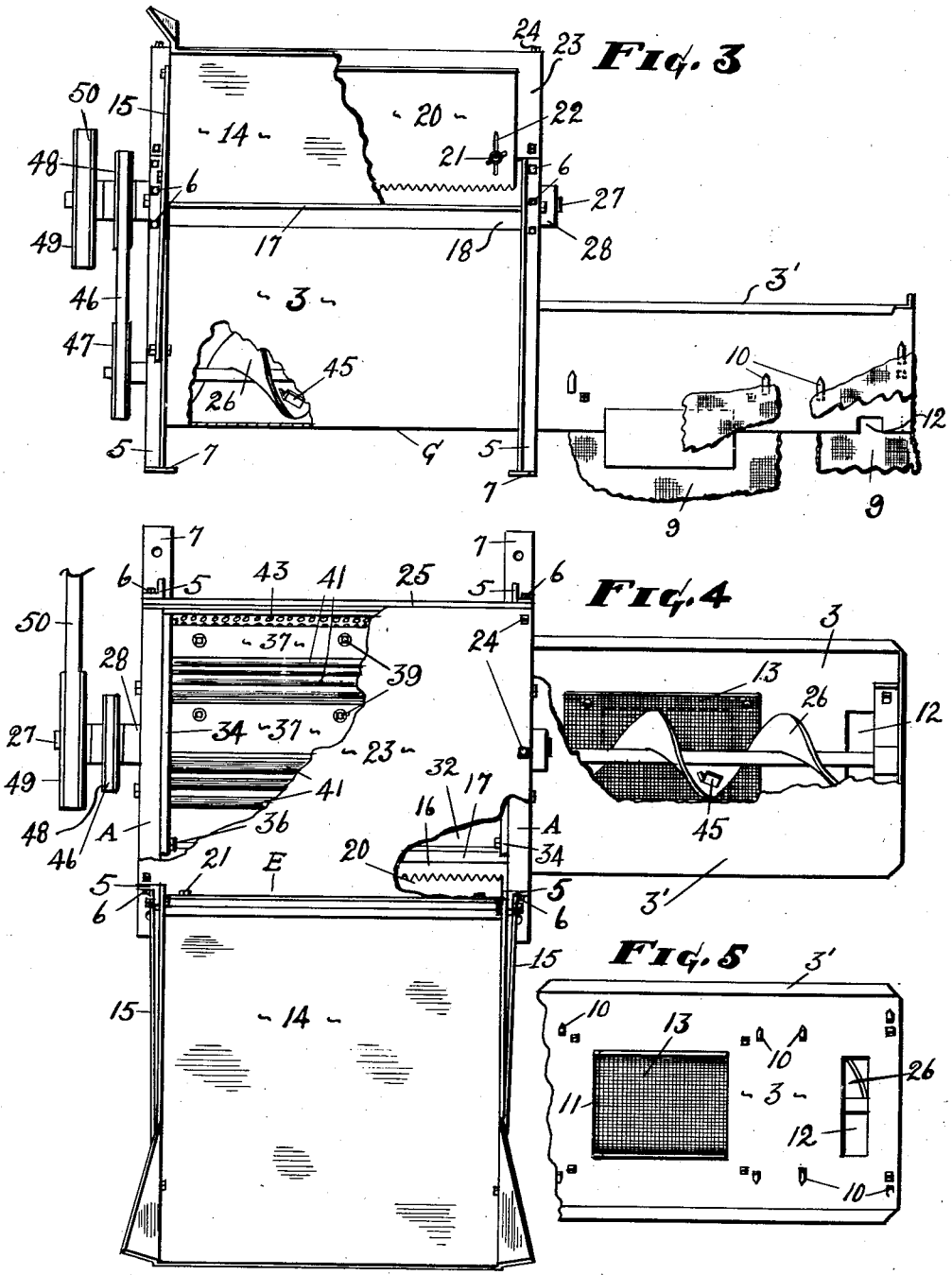

May 13, 1941.  H. J. MANKOFF  2,241,667
GRINDING MACHINE FOR SHELLED CORN OR OTHER GRAIN
Filed April 3, 1939   3 Sheets-Sheet 3
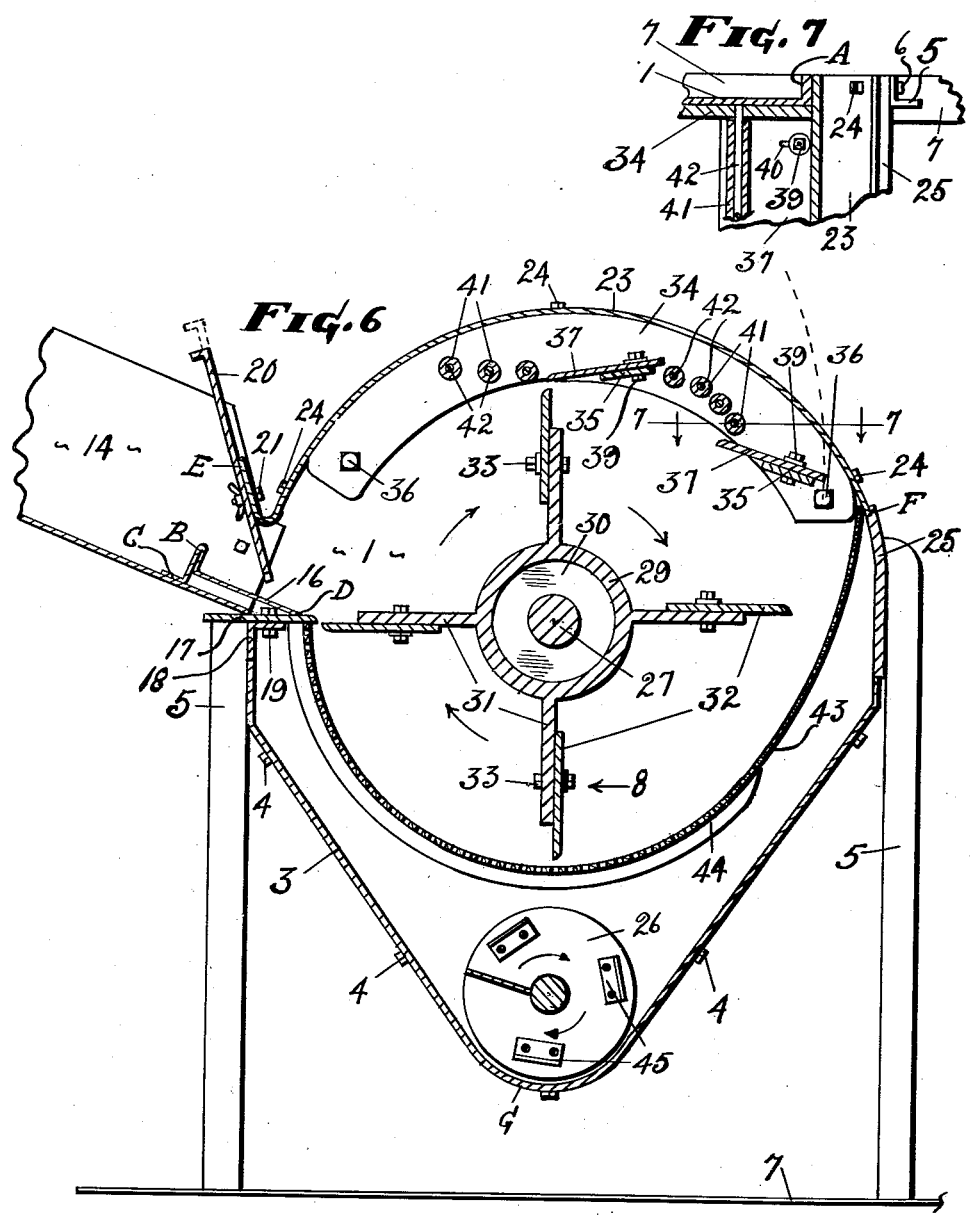
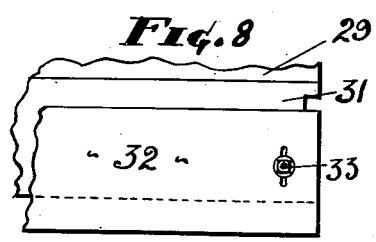
INVENTOR.
HENRY J. MANKOFF
BY
ATTORNEY.

Patented May 13, 1941

2,241,667

UNITED STATES PATENT OFFICE 2,241,667

GRINDING MACHINE FOR SHELLED CORN OR OTHER GRAIN

Henry J. Mankoff, Wichita, Kans.

Application April 3, 1939, Serial No. 265,635

4 Claims. (Cl. 83—11)

My invention relates to new and useful improvements in a grinding machine for shelled corn or other grain, and has for its principal objects: first, a means to crack the grain; second, a means to grade the broken particles; and third, to agitate, convey, and screen the finely comminuted portion from the coarse or graded portions as they leave the machine.

A further object of my invention is to provide a concave at the upper side of a grinding cylinder to crack the grain, and a perforated concave at the lower side of said cylinder and against which the cracked grain is frictionally engaged, comminuting the same sufficiently to pass through the perforations, and means to mix and convey the grain thus treated across a grading screen to separate pulverized substance from the cracked grain.

A still further object of my invention is to provide in connection with the upper concave, openings to function as a by-pass for comminuted grain and a means to avoid congestion of ground substance between said concave and a hood enclosure therefor, and furthermore, a means whereby such substance as it leaves the by-pass will be directed in contact with the perforated concave, at which instance substance comminuted sufficiently will be forced through the perforations by fan action of the cylinder while the coarse substance will be further ground.

A still further object of my invention is to produce a compact grinding machine having the capacity of preparing and grading a variety of poultry and live stock feed at a single run of the grain as fed therethrough. In other words, when shelled corn is the grain being treated, this machine will produce that which is commonly known to the trade, as steel cut corn, and corn chop. Furthermore, the machine can be arranged to produce a variety of grades by placing screens varying in mesh at intervals in the trough, and other kinds of grain may be likewise treated at the discretion of the operator.

These and other objects will hereinafter be more fully explained, reference being had to the accompanying drawings forming a part of this specification, in which like characters will apply to like parts in the different views.

Referring to the drawings:

Fig. 3 is a front elevation of the machine, parts removed for convenience of illustration.

Fig. 4 is a plan view of the machine, parts being removed for convenience of illustration.

Fig. 5 is an inverted view of the conveyor trough, fragmentarily shown.

Fig. 6 is an enlarged cross section through the machine.

Fig. 7 is a sectional view taken on line 7—7 in Fig. 6, looking in the direction of the arrows.

Fig. 8 is a fragmentary elevation of one of the cylinder blades looking in the direction of arrow 8 in Fig. 6.

Briefly, my invention herein set forth resides in the construction and function of certain elements, appropriately supported, said elements consisting of a grinding cylinder, an upper and lower concave in working relation to the cylinder, a hood arrangement for the upper concave, an auger having spaced along its web agitating or stirring elements co-operatively working with the auger, and grading means spaced along the auger trough for substance ground by the machine. However, other parts may be involved in the following detailed description relative to the aforesaid elements.

The machine as a whole consists of heads 1 and 2, head 1 being the closing means at one end of the cylinder, including the hopper portion 3, said head 2 being similar in contour except terminating at the upper extremity of an outward extending portion of said hopper, said hopper extension having a removable cover 3' to slide to and from engagement thereon.

Figure 1:
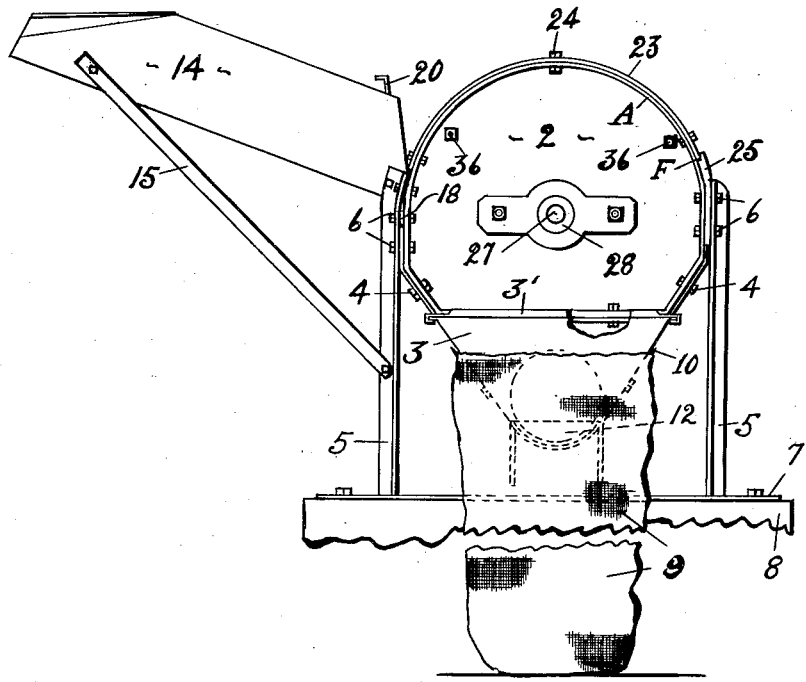
Fig. 1 is an end elevation of the machine.
Figure 2:
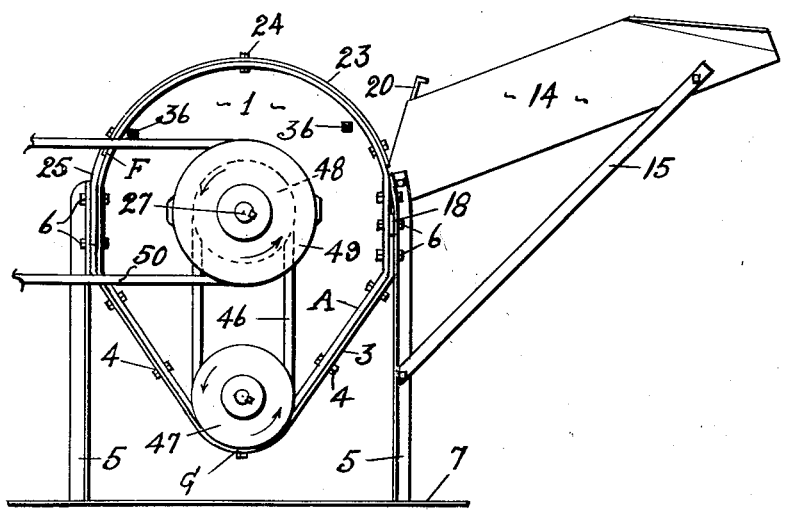
Fig. 2 is an end elevation opposite to that of Fig. 1.

The said heads and hopper constitute the body of the machine proper, and are secured together by bolts 4 as shown in Figs. 1 and 2. The said body is supported by legs 5 through the medium of bolts 6, passing through the leg and the outwardly extending flange A, said flanges being integrally formed with their respective heads. The lower extremity of each end pair of legs is connected by a bar 7 on which the structure rests, the bars each being apertured for leg screws as securing means for the machine to a suitable stand as at 8, as shown in Fig. 1, to elevate the hopper sufficient to pendantly carry sacks 9 seated on the floor or the like. The pendant supporting means consists of hooks 10, secured to the sides of the hopper as shown in Figs. 1 and 3, the top opening of said sacks being in registry with their respective exits 11 and 12 in the bottom and outer end of the trough. Opening 11 has a screen 13 secured thereover as bolting means for fine comminuted substance termed to the trade as meal or chop from ground corn, while openings 12 function as a discharge for the coarsely comminuted portion termed as steel cut corn.

The said body of the machine has a feed chut 14 secured thereto and being braced by arms 15 to position said chute at an angle from a horizontal plane outward and upward from the body, by which means shelled corn or other grain may be fed into the grinding cylinder by gravitation. The said chute has a baffle arrangement 16 transversely crossing the chute near its inner end as shown in Fig. 6, said baffle lapping back on itself as at B, the downwardly extending leg having a righ angle bend to seat on the bottom of the chute as at C, while the other leg is spaced upward from the chute bottom, and being in parallelism therewith, its terminal edge as at D resting upon the inner edge of a blade 17 that seats on an angle bar 18 and is secured thereto adjustably by bolts 19, whereby said blade may be moved to and from the blades of the cylinder, later described. The baffle functions as a retarding and spreading means for grain as it enters the cylinder chamber, and furthermore, resists an outward throw of grain from the cylinder, as the flow line is somewhat elevated at the point where it enters the cylinder, and coacts with the lower extremity of a plate 20 at the feed mouth of the machine. The lower edge o the plate 20 is serrated so that small grain will pass between the serrations when the plate is moved downward to a closed position, the principle of which is to avoid an outward throw of such grain from the mouth during the process of grinding; said plate being carried adjustably by bolts 21 with respect to vertical movement, the bolts engaging through their elongated slots 22 in the plate and corresponding apertures in an upturned portion E of a removable hood 23 that is secured to each head by bolts 24 spaced therearound and engaging through said head flanges previously referred to. The other edge of said hood opposite its upturned portion is adapted to seat on a shoulder F on bar 25, extending across and having its ends secured to their respective heads.

It will be seen that the upper edge of each side wall of the hopper engages snugly with its respective bar 25 and the lower leg of angle bar 18, as shown in Fig. 6, while the medial arcuate bend as at G functions as the trough to receive an auger 26 rotatable therein as a conveyor of the ground grain across said screen 13 prior to discharging the residue through openings 12, by which means, the said ground grain is graded as heretofore described.

The elements heretofore referred to as the principal features of this invention consist of a grinding cylinder comprised of a shaft 27 trunnioned in suitable bearings 28 secured to their respective heads of the body, said shaft axially extending through a tube 29, and being secured therein through the medium of a head 30 at each end of the tube, by which arrangement a plurality of radially extending wings 31 may be connected by welding the same to the tube to avoid disalignment of said shaft which otherwise would occur should said wings be directly welded to the shaft.

Adjustably secured to each wing is a blade 32 by bolts 33 engaging through elongated slots extending through their respective blades as shown in Fig. 8, by which means the outward extension of the cutting edges may be varied to closely engage with other blades, later described, and furthermore, to maintain a true balance of the cylinder upon its turning axis.

Removably secured to the heads in working relation to the cylinder is an upper concave mechanism consisting of a pair of arcuate end plates 34, being connected by a pair of bars 35 spaced apart along the arc of the plate as shown in Fig. 6, the corresponding ends of said bars being welded to their respective plates, and being of such length as to snugly fit the said arcuate plates between the heads of the body, said plates being secured by bolts 36. The said concave has a cutting blade 37 adjustably secured to each of said bars 35 through the medium of bolts 39 that extend through slot 40 in said blades as shown in Fig. 7.

Trunnioned between said blades and in front of the upper blade in working relation thereto is a plurality of sleeves 41, functioning as rollers, each of which is adapted to turn on its respective rod 42, axially extending therethrough, the ends of which removably engage in their respective apertures that are drilled through said end plates, it being understood that the said rods are free to rotate with the sleeves, and each of said sleeves may be removed by withdrawing its respective rod. The said sleeves, being so arranged and spaced apart, are means to avoid the accumulation of comminuted grain during the process of grinding grain fed into the cylinder, and such accumulation externally of the concave is free to move rearwardly and downwardly thereover to where it enters the grinding cavity being discharged therefrom by air blast from the grinding cylinder blades, except the coarse particles which return for regrinding, and it will be seen that the space between the hood and said rollers and blades will function as a by-pass for the air blast and finely comminuted substance to pass through freely for the purpose stated.

Positioned in close working relation to the blades of the cylinder is an arcuate perforated plate 43 to function as the lower concave against which, and by frictional engagement, broken particles of the grain are further comminuted sufficiently to pass through the perforations of the plate into the hopper. It will be understood that the said perforated plate is removable, being carried at each end by an arcuate shoulder 44, each of which inwardly extends from its respective head and is integral therewith.

It will be seen that when the said perforated plate is positioned properly as shown in Fig. 6, the front edge thereof will engage snugly with the under side of blade 17, and will be secured rigidly thereto by contact of the hood 23 at the other edge of said perforated plate, binding the same to snug engagement with the corresponding ends of the arcuate plates of the upper concave as shown in Fig. 6.

The machine herein set forth is provided with a plurality of perforated plates each varying with respect to the size of the perforations whereby grain comminution may be varied, selectively, by placing a selected plate at the time of grinding the grain.

The said auger, as rotatably placed in the trough of the hopper, is means to discharge the comminuted grain with the same or greater rapidity than the capacity of grinding the grain. To accomplish a definite separation or grading of the ground substance, there are arranged at intervals agitating or stirring elements 45 secured to the auger in close proximity to the periphery of the web, the said elements being L-shaped, one leg of each is secured to the conveying side of the web, while the other leg extends outwardly, functioning as a scoop to throw the ground substance outwardly from the axis of the auger so that the finely pulverized or finely comminuted portion will pass through the said screen as the mass passes thereover, while the coarse portion ejects through the opening 12, and each portion will be deposited in sacks as heretofore described.

The rotation of the auger is through the medium of a belt 46 connecting a sheave 47 on the auger shaft with a sheave 48 on the shaft of the grinding cylinder, the said cylinder shaft having another sheave 49 secured thereto and a belt 50 extending therefrom to a source of power as turning means therefor.

While I have shown and described a single screen opening, other openings may be provided with screens of different sized mesh, whereby a variety of comminution with respect to grading may be had, and such other modifications may be employed as lie within the scope of the appended claims.

Having fully described my invention what I claim as new and desire to secure by Letters Patent is:

1. In an upper concave for a grinding cylinder, a pair of arcuate plates spaced apart and bars to connect the plates, said bars spaced apart in parallelism, a blade adjustably carried by each bar, groups of rods spaced apart, extending from one arcuate plate to the other and adapted to turn as carried by the plates and each rod of said groups having a sleeve rotatable thereon, the sleeves extending from plate to plate, said groups of rods alternately positioned with the bars and their respective blades, and means to removably secure the arcuate plates to the hood of a grinding machine in such a way as to provide a by-pass between the hood and the elements of the concave carried by the arcuate plates.

2. In a grinding machine for shelled corn or other grain, a horizontal trough-like body wall, a head to close each end of the trough, a hood to close the open top of the trough, a feed opening formed between said wall and said hood, a feed chute communicating with said feed opening, a plate adjustably carried above the feed opening to open and close the same, a grinding cylinder having a plurality of radial wings, means to horizontally trunnion the same rotatably in said wall, an extendable blade adjustably secured to the side of each wing to vary the blade extension radially, a perforated arcuate plate secured in said body in working relation to the blades of the cylinder, one arcuate portion of the perforated plate having its radii centering on the axis of rotation of the cylinder while the radii of the other portion are centered eccentrically to said axis and are of greater length than the axis-centered radii to clear said eccentric portion from the arcuate sweep of the blades, the terminating edge of said last arcuate portion being secured to said wall, a blade adjustably carried by the wall adjacent the lower side of the feed opening and extending inwardly and across the terminating edge of the first arcuate portion of said perforated plate, there being an arcuate shoulder on each head to conform to said first arcuate portion and upon which said perforated plate will seat, and a concave carried by the hood and spaced inwardly therefrom to form a by-pass, said concave being composed of two groups of rollers and two blades alternating with said groups, said last-mentioned blades coacting with the blades of the cylinder when the latter is rotated, and the rollers of each group being spaced apart and being turned by material in the course of grinding to avoid congestion of material in the by-pass.

3. In a grinding machine as recited in claim 2, a baffle transversely crossing the feed chute a spaced distance outwardly of the feed opening and upwardly extending from the bottom of the chute to coact with the adjustable plate at the feed opening to avoid outward throw of comminuted material through the opening and to retard the flow of material conveyed by said chute into the machine.

4. In a grinding machine as recited in claim 2, a lower portion of the trough extending outwardly from its respective end head, said trough extension having an open top and a closed outer end, an outlet in the bottom of said trough extension adjacent the outer end and a second outlet spaced inwardly of said first outlet, said second outlet being covered by a screen functioning as a sieve, a removable cover to close the open top of said extension, a rotatable auger positioned in the trough and said extension and passing through said respective end head, to convey material ground by the machine to said outlets for discharge therethrough.

HENRY J. MANKOFF.